United States Patent
Pichot et al.

(10) Patent No.: US 11,472,635 B2
(45) Date of Patent: Oct. 18, 2022

(54) DEVICE, FACILITY AND METHOD FOR EJECTING PRODUCTS

(71) Applicant: SIDEL PARTICIPATIONS, Octeville-sur-Mer (FR)

(72) Inventors: Yann Pichot, Octeville-sur-Mer (FR); Denis Souffes, Octeville-sur-Mer (FR); Jocelyn Michel, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/297,579

(22) PCT Filed: Dec. 3, 2019

(86) PCT No.: PCT/FR2019/052900
§ 371 (c)(1),
(2) Date: May 27, 2021

(87) PCT Pub. No.: WO2020/115421
PCT Pub. Date: Jun. 11, 2020

(65) Prior Publication Data
US 2022/0033194 A1    Feb. 3, 2022

(30) Foreign Application Priority Data
Dec. 4, 2018    (FR) ...................... 1872269

(51) Int. Cl.
*B65G 47/84*    (2006.01)
*B65G 47/52*    (2006.01)
*B65G 43/08*    (2006.01)

(52) U.S. Cl.
CPC ........... *B65G 47/846* (2013.01); *B65G 43/08* (2013.01); *B65G 47/52* (2013.01); *B65G 47/84* (2013.01); *B65G 2201/0244* (2013.01)

(58) Field of Classification Search
CPC ........... B07C 5/36; B65B 57/00; B65G 29/00; B65G 43/08; B65G 47/84; B65G 47/82;
(Continued)

(56) References Cited

U.S. PATENT DOCUMENTS

| 2,085,410 A | 6/1937 | Bergmann |
| 2,152,107 A * | 3/1939 | Thompson ............... A23L 3/06 198/483.1 |

(Continued)

FOREIGN PATENT DOCUMENTS

NL    7403396 A1    9/1975

OTHER PUBLICATIONS

International search report dated Apr. 20, 2020.

*Primary Examiner* — James R Bidwell

(57) ABSTRACT

A device for ejecting products in a unit for processing products, a flow of the products moving one behind the other along a circulation trajectory. The device having an ejector for individually ejecting a product out of the circulation trajectory and a motor of the ejector. The ejector having at least one plate with a peripheral edge provided with at least one recess for receiving a single product and the motor having a rotation drive for the plate and a way for synchronizing the drive with the flow of the products. The invention relates also to an installation and an ejection method.

18 Claims, 3 Drawing Sheets

(58) Field of Classification Search
CPC ............ B65G 2201/0244; B65G 47/52; B65G 47/32; B65G 47/88; B65G 47/846
USPC .......................................... 198/482.1, 483.1
See application file for complete search history.

(56) References Cited

U.S. PATENT DOCUMENTS

| | | | | |
|---|---|---|---|---|
| 2,343,496 | A * | 3/1944 | Carroll .................... | A23N 4/06 |
| | | | | 221/233 |
| 3,014,574 | A | 12/1961 | Nussbaum | |
| 3,301,399 | A | 1/1967 | Ochs | |
| 3,488,994 | A * | 1/1970 | Harry ....................... | B07C 5/07 |
| | | | | 209/591 |
| 3,687,285 | A * | 8/1972 | Messervey ............. | B07C 5/122 |
| | | | | 209/591 |
| 3,710,922 | A | 1/1973 | Lanphere | |
| 4,019,622 | A * | 4/1977 | Messervey ............. | B65G 47/80 |
| | | | | 198/441 |
| 9,708,133 | B2 * | 7/2017 | Ballarotti ............. | B65G 47/846 |

* cited by examiner

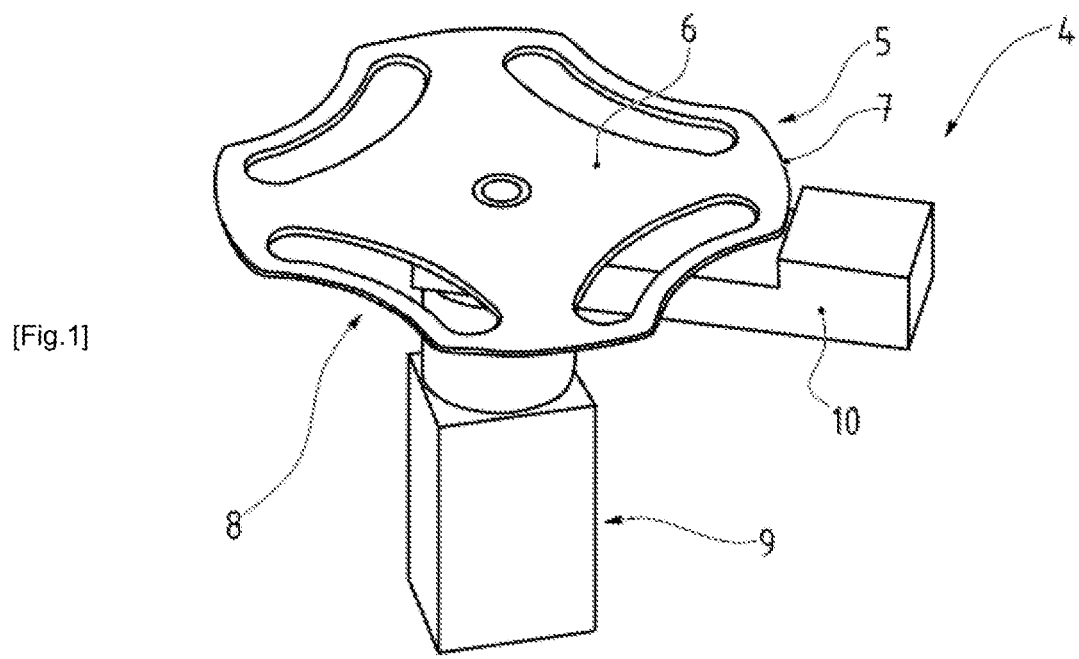
[Fig.1]
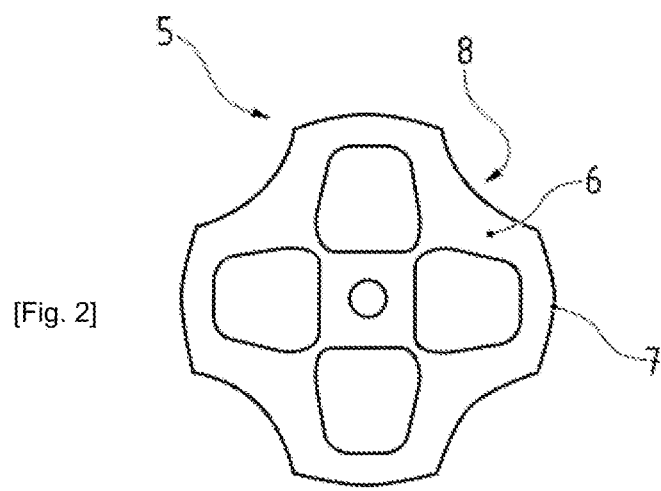
[Fig. 2]

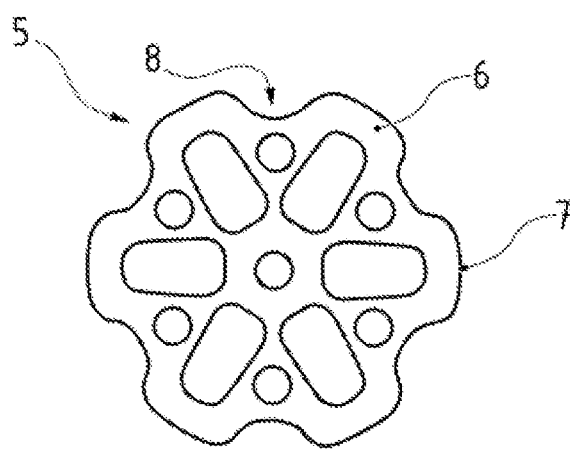
[Fig. 3]
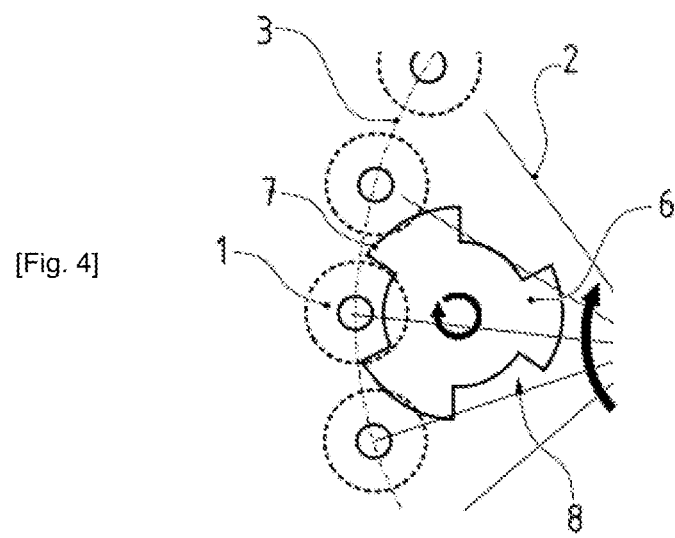
[Fig. 4]
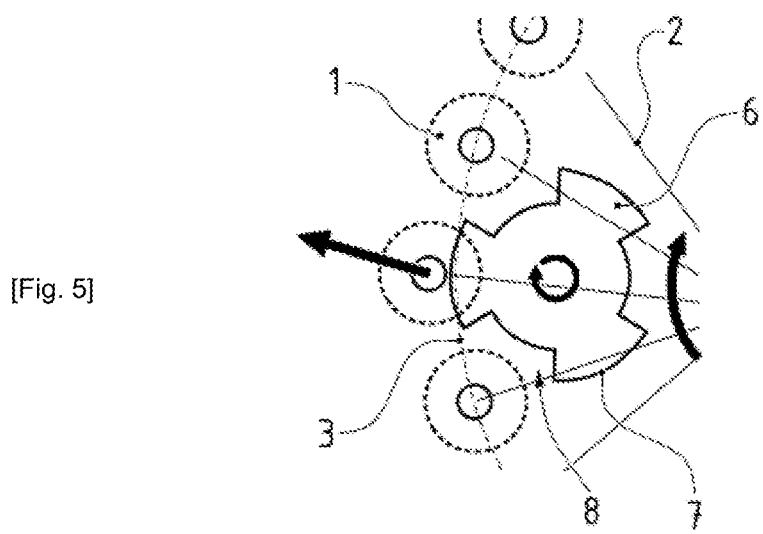
[Fig. 5]

[Fig. 6]
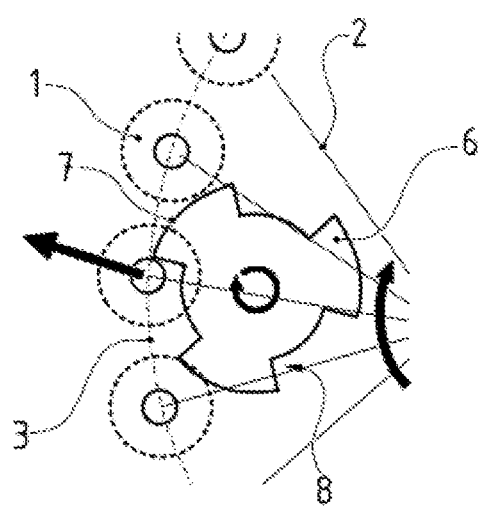

DEVICE, FACILITY AND METHOD FOR EJECTING PRODUCTS

The present invention lies in the field of the production and the processing of products in an industrial line.

Such products can be preforms, bottles, cans, flasks, boxes, bins, cardboard boxes or bundles, made of any type of material, notably of glass or of plastic, even cardboard-covered. Such products are generally intended to contain liquids, notably agri-food products.

In such an industrial line, the products can be subject to multiple different successive processing operations, ranging from the production of the container for example by a stretch blow-molding operation to the packaging in bins or bundles of multiple products grouped together, through filling and labeling of the products individually.

In this context, the products are successively taken over by processing stations, such as, for example, a blowing station supplied with preforms to manufacture bottles, followed by a filling station then a labeling station, or vice versa, before a possible station for bundling finished products in batches.

The invention will be applicable in the processing of products individually.

In this context, in an individual product processing station, the products are conveyed in succession, in a line one behind the other, from the outside to the interior of said station, then from the interior to the outside, notably by suitable conveyors. Inside the station, the products can be taken over by moving means specific to said station. In particular, such means can take the form of a rotary carrousel, provided at regular angular intervals with means suitable for holding the products as they are moved, such as, for example, means for gripping a part of each product, notably in the top part such as the neck or the mouth.

For multiple reasons, notably for a malfunction of a station situated upstream, it may be necessary to extract certain non-conforming products from the production flow. Similarly, in the case of a malfunction of all or part of a downstream station, such as, for example, a filling spout operating badly on a filling station, it may be necessary to eject all or part of the products arriving at this downstream station. For that, said products are ejected. Currently, one solution implemented consists of an ejection device provided with a pusher that is movable in translation from a retracted position to an ejection position, and vice versa. In ejection position, the pusher is moved to enter into the trajectory of circulation of the flow of products, to strike them and deflect them to another trajectory, oriented out of said production circuit.

Such a pusher can take the form of a wall that is inclined or rounded, generally divergently from the circulation trajectory and in the direction of advance of the products. Consequently, in ejection position, the products come into contact with the wall and slide longitudinally until they are taken out of their initial trajectory. Furthermore, the deflection along the wall ensures the forced extraction from the holding of the products, in particular by the gripping means.

Moreover, the pusher is generally actuated to move by a motorization of pneumatic type, with one or more pneumatic cylinders, that have the reactivity and the force required to, on the one hand, move from the retracted position to the ejection position, and, on the other hand, ensure the extraction of a held product. Furthermore, the motorization with pneumatic cylinder is suitable for the ejection of very heavy products, often exceeding a kilogram for a product of bottle type filled with fluid or liquid.

Such pneumatic ejection along a wall does however exhibit a limited reactivity, notably because of the force needed for the deployment of its cylinder and its inertia in deployed position, notably because of its rigid structure designed to be able to eject heavy products. Because of the dynamics, the wall remains deployed for a given time period, preventing its immediate return into retracted position. Consequently, multiple products may be ejected after, while only one non-conforming product needed to be ejected, because of the slowness of such a device, above all at high rates, which often provokes the ejection of multiple successive products.

In particular, it often happens that a malfunction originates from a single upstream station out of several regularly supplying the station provided with the ejection device. Consequently, a non-conforming product must be ejected at regular intervals in the production flow. The existing pneumatic solution often causes the ejection of products that are valid, which causes a consequential and pointless loss, but also prejudicial to the other stations situated downstream, which then receive a reduced quantity of products, going as far as reducing the output of all of the industrial line.

Moreover, in the case of a problem occurring at the station or the ejection device, an emergency stop does not allow the pneumatic device to remain in ejection position, which can be problematical for the time it takes to slow down the carrousel driving the products until it is fully stopped. Indeed, the products which have to be ejected remain in the production flow and must be removed manually.

Furthermore, the pneumatic operation creates a noisy sound environment, above all because of the stops in abutment of the pneumatic cylinders. Furthermore, the sudden movement of the pusher against the products can be prejudicial to their integrity, potentially breaking them and spreading their content, which necessitates a production stoppage for cleaning.

The aim of the invention is to overcome the drawbacks of the state of the art by proposing a device for ejecting products comprising rotary extraction means in plate form.

Such a plate has a peripheral edge and at least one recess formed in this peripheral edge, preferably multiple recesses. During its rotation, even when stopped, the peripheral edge crosses the trajectory of circulation of the products in order to eject one or more thereof, while each recess allows support for a single product moving along said circulation trajectory. Thus, by synchronizing or phase-shifting the rotation of the plate with respect to the circulation of the products, the ejection device allows one product to be extracted at a time or several thereof to pass one after the other, inside each of its recesses.

For this, such an ejection device is installed in a unit for processing said products, a flow of said products moving one behind the other along a circulation trajectory.

Said ejection device comprises at least:
- a means for individually ejecting a product out of said circulation trajectory;
- motorization means of the ejection means, wherein
- said ejection means comprises at least one plate with a peripheral edge provided with at least one recess for receiving a single product;
- said motorization means comprising a rotation drive for said plate and means for synchronizing said drive with the flow of said products.

Additionally, but in a nonlimiting manner, said plate can comprise at least three recesses distributed regularly along the peripheral edge.

Each recess can have a concavity conformed to complement at least a part of the form of each of said products, so as to at least partially introduce said part of said form into said recess.

Said motorization means can comprise a rotary motor with a transmission shaft supporting said plate through at least a rolling bearing and/or a gear.

Said motorization means can comprise a means for locking said plate in a position of ejection of said products.

The invention relates also to an installation in an industrial line for producing and processing products, comprising:
- at least one conveyor moving along a trajectory of circulation of said products one behind the other in the form of a flow of products;
- at least one ejection device for ejecting said products according to the invention,
- each ejection device being positioned at the edges of said conveyor, wherein each plate of each ejection device is positioned at least:
- according to an angular position of ejection of a product, with its peripheral edge which extends at least partially penetrating into said trajectory of circulation of said conveyor;
- according to another angular position of supporting of a product, with at least one recess with a concavity leaving said trajectory of circulation of said conveyor at least partially free.

The invention relates also to a method for ejecting products in a unit for processing said products, wherein:
- a flow of products is moved one behind the other at regular intervals and is moved along a circulation trajectory;
- at least one ejection device comprising at least one plate with a peripheral edge provided with at least one recess for receiving a single product is positioned at a point of said circulation trajectory;
- said plate is driven in rotation; wherein, at least:
- said plate is positioned with the peripheral edge penetrating into said circulation trajectory;

and wherein the rotation of said plate is driven with respect to the movement of said flow of products:
- synchronously, by angularly positioning a recess substantially tangentially to said circulation trajectory, so as to support the movement of a product in said recess;
- or
- out-of-phase, by angularly positioning a recess in an interval between two products following one another, so as to eject the product situated downstream with respect to the direction of movement of said flow.

Additionally, in a nonlimiting manner, synchronously, the peripheral edge can be positioned in an interval between two products following one another.

Other features and advantages of the invention will emerge from the following detailed description of nonlimiting embodiments of the invention, with reference to the attached figures in which:

FIG. 1 schematically represents a perspective view of an embodiment of an ejection device;

FIG. 2 schematically represents a top view of a plate of the ejection device according to an embodiment, FIG. 3 schematically represents a top view of another embodiment of a plate;

FIG. 4 schematically represents a top view of an embodiment, showing the plate in an angular position of supporting of a product; and FIG. 5 schematically represents a view similar to FIG. 4, showing the plate in an angular position of ejection of a product by contact with the peripheral edge; and FIG. 6 schematically represents a view similar to FIG. 5, showing the plate in another angular position of ejection of a product by contact with the inside edge of a recess.

The present invention relates to the production and processing of products 1 in an industrial line, in particular in a processing unit of such an industrial line.

Such products can be bottles or flasks, preferably products that have a neck, made of any type of material, notably of glass or of plastic, even cardboard-covered. Such products are generally intended to contain liquids, notably of agrifood type.

Such an industrial line comprises at least one installation. Said installation is provided with at least one conveyor. It ensures the transporting of the products 1 over at least a part of the length of said installation. Said conveyor moves the products 1 one behind the other, at regular intervals, forming a flow of circulation of said products 1. It is the space between the products 1 which then determines the interval of the flow. As an example, such a conveyor can be an endless belt, the bottom of the products 1 resting on the surface of the conveyor. Said conveyor can comprise shuttles each supporting a product 1, said shuttles being moved independently or not along said conveyor. It is then the space between the shuttles which determines the interval between the products 1 of the flow.

Preferentially, said conveyor is of rotary type and can comprise a carrousel 2 provided with a plurality of means for gripping a single product 1, such as, for example, a clamp grasping and holding a part of a product 1, notably the body of the product 1, even the neck in the case of a product 1 of container type, such as a flask or a bottle. Consequently, it is the spacing between the gripping means which determines the interval between the products 1 of the flow. An example of conveyor of rotary type is represented partially and in a simplified manner in FIGS. 4 to 6.

In one case as in the other, the flow has a regular interval between the products 1, which are spaced apart approximately by the same distance. The invention will be able to be adapted to an irregular interval between the products 1.

Said conveyor can be situated at the input or at the output of a station or of a unit for processing the products 1, or even between two successive stations, within said installation. As a nonlimiting example, the conveyor can be a transfer wheel for products, notably preforms or containers such as bottles, notably said wheel being situated at the input of a stretch blow-molding station for said preforms in order to manufacture containers, at the output of a stretch blow-molding station for discharging the duly manufactured containers, or else at the input, at the output or within a filling or labeling machine.

Thus, the products 1 are moved along a circulation trajectory 3, via the at least one conveyor.

To this end, said trajectory 3 for circulation of the flow of products 1 is a mean trajectory that all the products of said flow substantially follow over a given distance within the installation. This trajectory 3 can correspond to the path traveled by a determined point of each product 1 in its movement, such as, for example, its center of gravity or a point of its peripheral wall, notably a point of its mouth.

An example of trajectory 3 for circulation of products 1 is represented in FIGS. 4 to 6, said circulation trajectory corresponding to the movement of the centers of the mouths (represented by a solid circle) of the containers (whose bodies are represented by dotted circles).

As explained previously, in the event of malfunctioning of a processing station or for another reason inherent to the operation of the installation, such as, for example, sampling, it has to be possible to extract at least one product 1 from the circulation flow, even multiple products 1, above all if they do not conform.

For this, the invention relates to a device 4 for ejecting products 1 within the industrial line for the production and processing of said products 1. Such a device ensures the individual ejection of a product 1 out of said circulation trajectory. It therefore allows one product 1 to be extracted at a time from the flow. Each ejected product 1 can be relocated in another circulation, for example for sampling, or else sent to a storage space provided for that purpose. For this, the ejection device 4 comprises a means 5 for individually ejecting a product 1 out of said circulation trajectory.

In the installation, each ejection device 4 is positioned at the edges of said conveyor. An ejection device 4 can be situated on one side, above or below the conveyor, some of its constituent elements being able to extend beyond a side, wholly or partly above or below the conveyor. In particular, said ejection means 5 is situated above or below the conveyor, preferentially above a belt conveyor or below a carrousel. Advantageously, said ejection means 5 comprises at least one plate 6. Such a plate 6 can have an overall circular form. It can be in the form of a disk, internally holed, in order to save on material and reduce its weight. The plate 6 can be made of any type of material, preferentially of metal, notably of steel or of aluminum.

It is the plate 6 which therefore allows at least one product 1 at a time to be ejected from the circulation trajectory 3. The plate 6 can therefore at least partly penetrate the circulation trajectory 3.

For this, the plate 6 comprises a peripheral edge 7 provided with at least one recess 8 for receiving a single product 1. Preferably, the plate 6 comprises several recesses 8, notably at least three recesses 8. The recesses 8 can be distributed regularly or not along said peripheral edge 7. As can be seen in the examples of FIGS. 1 to 3, the plate 6 can comprise an even number of recesses 8, distributed symmetrically pairwise, diametrically opposite, making it possible to confer an equilibrium on the plate 6 in its operation. Several nonlimiting examples of different plates 6, with different forms of recesses 8, and of number of recesses 8, can be seen in FIGS. 1 to 3.

In these figures, several recesses 8 are separated by a portion of length of the peripheral edge 7.

A plate 6 can have recesses 8 with forms that are different or, preferentially, identical. The form of each recess 8, notably its curvature, can be determined, non-exhaustively, as a function of the rate of circulation of the products 1 at this point of the installation, the form of the products 1 or of multiple formats of products 1 likely to be processed by the same installation.

According to one embodiment, each recess 8 can have a concavity. It is formed from the outside to the inside of the plate 6. Each concavity is conformed to complement at least a part of the form of each of said products 1, so as to at least partially introduce said part of said form into said recess 8. In other words, the concavity of a recess 8 allows a part of a product 1, notably a part of its mouth or else a part of its body or of its lateral wall, to be received. A single product 1 can be inserted partially into a recess 8. A recess 8 therefore allows a product 1 to be supported in its movement by the conveyor along the circulation trajectory 3.

For this, in the installation according to the invention, each plate 6 of each ejection device 4 is positioned specifically with respect to the rest of the installation, in particular with respect to the conveyor. At least two positions are possible.

Also, according to an angular position of ejection of a product 1, the plate 6 is positioned with its peripheral edge 7 which extends at least partially penetrating into said circulation trajectory 3 of said conveyor. In other words, the plate 6 is placed, with respect to the conveyor, so that its peripheral edge 7 crosses the circulation trajectory 3, above or below depending on the type of conveyor. Consequently, any product 1 which circulates comes into contact with the peripheral edge 7, which forms an obstacle, and each product 1 is moved away from its initial trajectory, leaving the flow.

Also, according to another angular position of supporting of a product 1, the plate 6 is positioned with at least one recess 8 with its concavity leaving said circulation trajectory 3 of said conveyor at least partially free. In other words, in this other position, the movement of a product 1 is not interrupted by the plate 6 or its peripheral edge 7, since the product 1 enters at least partially into a recess 8, without encountering any obstacle.

Other positionings of the ejection device 4 can be envisaged, as a function of the other angular positions of the plate 6, notably for a recess 8 to have its edge or its rim situated downstream with respect to the direction of circulation, penetrating into the circulation trajectory 3: the product 1 partially inserted into said recess 8 then taps against this downstream edge and is ejected. It is no longer the peripheral edge 7, but the end of the recess 8, which forms an obstacle to the progress of a product 1 in its movement.

In one case as in another, the pressure can be effected by pressure against a product 1 in a zone where its center of gravity is situated, in order to ensure its ejection and minimizing the risks of making it topple over or else making it pivot about its gripping means in the case of a conveyor of carrousel type. As an example, an empty bottle made of plastic material can have a center of gravity situated in the upper third and it is then possible to position the plate 6 for it to come to press in this zone.

In the case of a bottle filled with a liquid or a fluid, the center of gravity is low and the contact can be made in a zone situated below the upper third.

Preferentially, the pressure is effected against the neck of a product of bottle type, at the most rigid point, above all when it is empty.

It is therefore as a function of the rotation of the ejection means 5 that the ejection device 4 allows a product 1 to be discharged from the flow or allowed to pass for it to continue along the circulation trajectory 3.

The ejection device 4 comprises motorization means 9 of the ejection means 5.

The motorization means 9 can be situated at another location, with respect to the ejection means 5, linked by a suitable transmission. According to the embodiment represented in FIG. 1, the motorization means 9 are positioned under the plate 6.

Advantageously, the ejection device 4 is provided to be rotary. For this, said motorization means 9 comprise a rotation drive for said plate 6. According to one embodiment, said motorization means 9 can comprise a rotary motor, preferably a synchronous motor, notably of brushless type, which allows the angular position of its rotor, namely the carrousel 2 in the present invention, to be known at any instant. Said rotary motor can comprise a transmission shaft supporting said plate 6 through at least a rolling bearing and/or a gear. Said shaft can be positioned by fixing at the center of the plate 6. In particular, each rolling bearing allows the impacts to be limited and the loads applied to the shaft to be absorbed when a product 1 enters into contact with said plate 6, in particular with its peripheral edge 7 at the moment of an ejection.

Furthermore, a frame 10 allows the ejection device 4 to be linked and fixed to another structural component of the installation. This frame 10 can be connected to the motorization means 9 or to a housing with which the ejection device 4 is equipped.

In the exemplary embodiment of FIG. 1, the frame 10 comprises at least one arm or a holding bar, extending transversely, beyond the diameter of the plate 6, to be secured onto the structure of the installation. In addition to the dimensioning of the ejection device 4 and the form of its plate, the frame 10 and its bar notably allow the placement of said ejection device 4 to be adjusted.

As can be seen, the ejection device 4 is offset laterally by the bar of the frame 10, forming the free space necessary for its rotation and ensuring the good positioning of the plate 6 to ensure the ejection and the supporting of the products 1 during its rotation. Such a fixed mechanical link by the bar of the frame 10 may be required in a volume with reduced bulk, as is often the case at the output of a conveyor of carrousel type or within such an installation.

Moreover, the diameter of the plate 6 can be determined for the body of a product 1 not to tap against the motor situated below, notably by contact and ejection at the neck of a bottle.

The same can apply for the dimensioning of the concavity of each recess 8, allowing a part of the mouth of a bottle to be received internally, without its body entering into contact with the motor situated below. As an example, the radial distance between the center of the plate 6 and the point closest to the concavity of each recess 8 can be at the minimum greater than half the diameter of a product 1, preferentially of a bottle.

As described previously, the control of the rotation of the plate 6 of the ejection device 4 determines the ejection or the supporting of each product 1 of the flow. For this, the ejection device 4 comprises means for synchronizing said drive with the flow of said products 1. The synchronizing means allow the plate 6 to be rotated at different speeds, in order to, at a given instant, angularly position the peripheral edge 7 penetrating into the circulation trajectory or else position a recess 8 upon passage of a product 1 moving at this point in following the circulation trajectory 3.

Thus, according to the invention, the rotation of said plate 6 is driven with respect to the movement of said flow of products 1, on the one hand synchronously, by angularly positioning a recess 8 substantially tangentially to said circulation trajectory 3, so as to support the movement of a product 1 within said recess 8. An example of such synchronization is represented in FIG. 4.

According to one embodiment, it is possible to position the peripheral edge 7 synchronously within an interval between two products 1 following one another. The plate 6 is then driven at a corresponding speed that is a function of the scrolling of the products 1, which are inserted at least partially into two successive recesses 8. The products 1 are supported and remain on their circulation trajectory 3.

Alternatively, said plate 6 is driven in rotation with respect to the movement of said flow of products 1, on the other hand, out-of-phase, by angularly positioning a recess 8 in an interval between two products 1 following one another, so as to eject the product 1 situated upstream with respect to the direction of movement of said flow. In this configuration, the peripheral edge 7 then intersects the circulation trajectory 3, forming an obstacle to a product 1 circulating therein, which is then ejected. An example of such phase-shifted operation is represented in FIG. 5.

Another example of phase-shifting is represented in FIG. 6, showing an at least partial positioning of a recess 8 supporting a product 1, but with a speed of rotation of the plate 6 such that the product 1 circulates along the recess 8 and strikes the rim of the recess 8 situated downstream with respect to the direction of circulation (i.e. the rim of the recess 8 situated on the side of the clockwise rotation of the plate 6 in FIG. 6).

The switch from synchronization to phase-shifting, and vice versa, can be made by an automatic controller, allowing the speed of rotation applied to the plate 6 to be accelerated or slowed down, to position it angularly to eject or support one of said products 1, that is to say one single product at a time.

According to one embodiment, said motorization means 9 can comprise a means for locking said plate 6 in a position of ejection of said products 1. It is then possible to stop the plate 6 for it to continuously block the circulation trajectory 3, provoking the successive ejection of all the products 1 circulating therein. Such locking can be automatic, controlled by a controller to make the plate 6 rotate to an indexed stop position, notably in the case of an emergency stoppage.

Additionally, said motorization means 9 can be turned manually by an operator, in order to bring them into a determined angular position, to eject or support.

Thus, the ejection device 4 and its implementation method allow a product 1 of a flow moving within an installation according to the invention to be extracted or supported. In particular, by forming an obstacle to its progress, the angular positioning of the peripheral edge 7 or of a recess 8 of the plate 6 by controlling its rotation, ensures an ejection force that is sufficient to take a product 1 out of the flow, in particular by applying an ejection force greater than the gripping force of a conveyor of carrousel type provided with gripping means.

The invention claimed is:

1. A device (4) for ejecting products (1) in a unit for processing said products, a flow of said products (1) moving one behind the other along a circulation trajectory (3), said ejection device (4) comprising:
    an ejector (5) for ejecting a product (1) individually out of said circulation trajectory (3);
    a motor (9) of the ejector (5), wherein
    said ejector (5) comprises at least one plate (6) with a peripheral edge (7) provided with at least one recess (8) for receiving a single product (1);
    said motor (9) comprising a rotation drive for said plate (6) and means for synchronizing said drive with the flow of said products (1), said synchronizing means configured to rotate the plate (6) at a speed that positions the peripheral edge (7) angularly at the crossing of the circulation trajectory (3) to individually eject products coming in contact with the peripheral edge (7).

2. The ejection device (4) as claimed in claim 1, wherein said plate comprises at least three recesses distributed regularly along the peripheral edge.

3. The ejection device (4) as claimed in claim 2, wherein each recess (8) has a concavity conformed to complement at least a part of a form of each of said products (1), so as to at least partially introduce said part of said form into said recess (8).

4. The ejection device (4) as claimed claim 2, wherein said motorization means (9) comprise a rotary motor with a transmission shaft supporting said plate (6) through at least a rolling bearing and/or a gear.

5. The ejection device (4) as claimed in claim 2, wherein said motorization means (9) comprise a means for locking said plate (6) in a position of ejection of said products (1).

6. The ejection device (4) as claimed in claim 1, wherein each recess (8) has a concavity conformed to complement at least a part of a form of each of said products (1), so as to at least partially introduce said part of said form into said recess (8).

7. The ejection device (4) as claimed claim 6, wherein said motorization means (9) comprise a rotary motor with a transmission shaft supporting said plate (6) through at least a rolling bearing and/or a gear.

8. The ejection device (4) as claimed in claim 6, wherein said motorization means (9) comprise a means for locking said plate (6) in a position of ejection of said products (1).

9. The ejection device (4) as claimed claim 1, wherein said motor (9) comprise a rotary motor with a transmission shaft supporting said plate (6) through at least a rolling bearing and/or a gear.

10. The ejection device (4) as claimed in claim 9, wherein said motorization means (9) comprise a means for locking said plate (6) in a position of ejection of said products (1).

11. The ejection device (4) as claimed in claim 1, wherein said motor (9) comprise a means for locking said plate (6) in a position of ejection of said products (1).

12. An installation in an industrial line for producing and processing products (1), comprising:
    at least one conveyor moving along a trajectory (3) of circulation of said products (1) one behind the other in a flow of products;
    at least one ejection device (4) for ejecting said products (1) individually out of said trajectory (3), said ejection device (4) comprising an ejector (5) and a motor (9), wherein said ejector has at least one plate (6) with a peripheral edge (7) provided with at least one recess (8) for receiving a single product (1) and said motor (9) has at least a rotation drive for said plate (6) and means for synchronizing said drive with the flow of said products (1),
    each ejection device (4) being positioned at the edges of said conveyor, wherein each plate (6) of each ejection device (4) is positioned:
        in an angular position of ejection of a product (1), with its peripheral edge (7) which extends at least partially into said circulation trajectory (3) of said conveyor; and
        according to another angular position of supporting of a product (1), with at least one recess (8) with a concavity leaving said circulation trajectory (3) of said conveyor at least partially free.

13. The installation as claimed in claim 12, wherein said plate comprises at least three recesses distributed regularly along the peripheral edge.

14. The installation as claimed in claim 12, wherein each recess (8) has a concavity conformed to complement at least a part of the form of each of said products (1), so as to at least partially introduce said part of said form into said recess (8).

15. The installation as claimed claim 12, wherein said motor (9) comprise a rotary motor with a transmission shaft supporting said plate (6) through at least a rolling bearing and/or a gear.

16. The installation as claimed in claim 12, wherein said motor (9) comprise a means for locking said plate (6) in a position of ejection of said products (1).

17. A method for ejecting products in a unit for processing said products (1), wherein:
    a flow of products (1) is moved one behind the other at regular intervals and is moved along a circulation trajectory (3);
    at least one ejection device (4) comprising at least one plate (6) with a peripheral edge (7) provided with at least one recess (8) for receiving a single product (1) is positioned at a point of said circulation trajectory (3);
    said plate (6) is driven in rotation, wherein:
        said plate (6) is positioned with the peripheral edge (7) penetrating into said circulation trajectory (3); and
        said plate (6) is driven in rotation with respect to the movement of said flow of products (1):
            synchronously, by angularly positioning a recess (8) substantially tangentially to said circulation trajectory (3), so as to support the movement of a product (1) inside said recess (8); or
            out-of-phase, by angularly positioning a recess (8) in an interval between two products (1) following one another, so as to eject the product (1) situated downstream with respect to the direction of movement of said flow.

18. The ejection method as claimed in claim 17, wherein, synchronously, the peripheral edge (8) is positioned in an interval between two products (1) following one another.

* * * * *